United States Patent
He

(10) Patent No.: US 11,403,730 B2
(45) Date of Patent: Aug. 2, 2022

(54) METHOD AND APPARATUS FOR PROCESSING IMAGE

(71) Applicant: BEIJING BYTEDANCE NETWORK TECHNOLOGY CO., LTD., Beijing (CN)

(72) Inventor: Qian He, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 16/967,975

(22) PCT Filed: Nov. 19, 2018

(86) PCT No.: PCT/CN2018/116176
§ 371 (c)(1),
(2) Date: Aug. 6, 2020

(87) PCT Pub. No.: WO2020/024483
PCT Pub. Date: Feb. 6, 2020

(65) Prior Publication Data
US 2021/0366076 A1    Nov. 25, 2021

(30) Foreign Application Priority Data

Aug. 3, 2018   (CN) .......................... 201810875903.2

(51) Int. Cl.
*G06T 3/00*    (2006.01)
*G06V 10/25*   (2022.01)
(Continued)

(52) U.S. Cl.
CPC ............ *G06T 3/0093* (2013.01); *G06V 10/25* (2022.01); *G06V 10/462* (2022.01); *G06V 40/103* (2022.01)

(58) Field of Classification Search
CPC ............... G06K 9/4671; G06K 9/3233; G06K 9/00369; G06T 3/0093
See application file for complete search history.

(56) References Cited

U.S. PATENT DOCUMENTS

| 6,757,445 | B1 * | 6/2004 | Knopp | .................. G01C 11/06 382/154 |
| 10,356,341 | B2 * | 7/2019 | Holzer | .................. G06T 7/194 |

(Continued)

FOREIGN PATENT DOCUMENTS

| CN | 101599177 | 12/2009 |
| CN | 102609683 | 7/2012 |

(Continued)

OTHER PUBLICATIONS

International Search Report and Written Opinion issued in PCT Appln. No. PCT/CN2018/116176, dated May 6, 2019.

*Primary Examiner* — Pinalben Patel
(74) *Attorney, Agent, or Firm* — BakerHostetler

(57) ABSTRACT

Techniques for processing an image are described herein. The disclosed techniques include a target human body image is acquired, and a skeleton key point data set is determined from the target human body image. Based on the skeleton key point data set, a target region in the target human body image is determined, and for each of pixel points comprised in the target region, performing coordinate transformation is performed on the pixel point, to generate a transformed coordinate of the pixel point. With the embodiment, different coordinate transformations may be performed on pixel points of different regions in the target human body image, thereby improving flexibility of performing the coordinate transformation on the pixel points.

15 Claims, 9 Drawing Sheets

(51) Int. Cl.
    *G06V 10/46*     (2022.01)
    *G06V 40/10*     (2022.01)

(56) References Cited

U.S. PATENT DOCUMENTS

| | | | | |
|---|---|---|---|---|
| 2009/0252423 | A1* | 10/2009 | Zhu | G06K 9/00201 |
| | | | | 382/209 |
| 2016/0088284 | A1* | 3/2016 | Sareen | G06N 3/006 |
| | | | | 348/47 |
| 2021/0012470 | A1* | 1/2021 | Yan | G06T 5/005 |

FOREIGN PATENT DOCUMENTS

| | | |
|---|---|---|
| CN | 102629315 | 8/2012 |
| CN | 102708560 | 10/2012 |
| CN | 105160328 | 12/2015 |
| CN | 107277481 | 10/2017 |
| CN | 10757831 | 1/2018 |
| CN | 107633247 | 1/2018 |
| CN | 108198141 | 6/2018 |
| CN | 108346130 | 7/2018 |

\* cited by examiner

METHOD AND APPARATUS FOR PROCESSING IMAGE

The present application is the national phase application of International Patent Application No. PCT/CN2018/116176, titled "METHOD AND APPARATUS FOR PROCESSING IMAGE", filed on Nov. 19, 2018, which claims priority to Chinese Patent Application No. 201810875903.2, titled "METHOD AND APPARATUS FOR PROCESSING IMAGE", filed on Aug. 3, 2018 with the Chinese Patent Office by Beijing Bytedance Network Technology Co., Ltd., both of which are incorporated herein by reference in their entireties.

FIELD

The present disclosure relates to the technical field of computers, and in particular to a method and an apparatus for processing an image.

BACKGROUND

With the development of computer technologies, a great number of applications for processing images are developed. These applications can be used to process a captured image, such as reshaping a figure in the image, recoloring the image, or adding a material to the image. In existing methods for reshaping a human body in an image (for example, a body slimming process), generally the entirety or a part of the human body is reshaped in a fixed scale.

SUMMARY

A method and an apparatus for processing an image are provided according to embodiments of the present disclosure.

In a first aspect, a method for processing an image is provided according to embodiments of the present disclosure. The method includes: acquiring a target human body image; determining a skeleton key point data set from the target human body image; determining, based on the skeleton key point data set, a target region in the target human body image; and for each of pixel points included in the target region, performing coordinate transformation on the pixel point, to generate a transformed coordinate of the pixel point.

In some embodiments, the determining, based on the skeleton key point data set, a target region in the target human body image includes: determining, based on skeleton key point data in the skeleton key point data set, a transverse boundary line in the target human body image; selecting at least two pieces of skeleton key point data from the skeleton key point data set to form a reference skeleton key point data set; determining, based on the reference skeleton key point data set, a longitudinal boundary line in the target human body image; and determining the target region as a region surrounded by the transverse boundary line and the longitudinal boundary line.

In some embodiments, the reference skeleton key point data set includes shoulder joint key point data and hip joint key point data. The determining, based on the reference skeleton key point data set, a longitudinal boundary line in the target human body image includes: determining, based on the shoulder joint key point data and the hip joint key point data, a longitudinal central line of the target human body image; determining a distance between a position represented by the shoulder joint key point data and a position represented by the hip joint key point data, and determining a reference distance based on the determined distance; and determining, on each of two sides of the longitudinal central line, a straight line at the reference distance from the longitudinal central line as the longitudinal boundary line.

In some embodiments, before the for each of pixel points included in the target region, performing coordinate transformation on the pixel point, to generate a transformed coordinate of the pixel point, the method further includes: determining at least two pieces of target reference skeleton key point data from the reference skeleton key point data set, and acquiring abscissas included in the target reference skeleton key point data; transforming the abscissas in the target reference skeleton key point data based on a predetermined abscissa transformation formula; and performing curve fitting on the abscissas in the target reference skeleton key point data and the transformed abscissas, to obtain a coordinate transformation table representing a correspondence between an abscissa in the skeleton key point data and a transformed abscissa.

In some embodiments, the performing coordinate transformation on the pixel point, to generate a transformed coordinate of the pixel point includes: determining an initial transformed abscissa of the pixel point based on the coordinate transformation table; determining a region containing the pixel point in the target human body image, and determining a transformation coefficient corresponding to the region containing the pixel point, where a correspondence between the region containing the pixel point and the transformation coefficient is set in advance; transforming the initial transformed abscissa of the pixel point based on the determined transformation coefficient, to obtain a final transformed abscissa of the pixel point; and determining the final transformed abscissa of the pixel point and an ordinate of the pixel point as the transformed coordinate of the pixel point.

In some embodiments, after the for each of pixel points included in the target region, performing coordinate transformation on the pixel point, to generate a transformed coordinate of the pixel point, the method further includes: reshaping the target region based on the obtained transformed coordinate, to obtain a reshaped human body image.

In a second aspect, an apparatus for processing an image is provided according to embodiments of the present disclosure. The apparatus includes an acquiring unit, a first determining unit, a second determining unit, and a transforming unit. The acquiring unit is configured to acquire a target human body image. The first determining unit is configured to determine a skeleton key point data set from the target human body image. The second determining unit is configured to determine, based on the skeleton key point data set, a target region in the target human body image. The transforming unit is configured to, for each of pixel points included in the target region, perform coordinate transformation on the pixel point, to generate a transformed coordinate of the pixel point.

In some embodiments, the second determining unit includes a first determining module, a selecting module, a second determining module, and a third determining module. The first determining module is configured to determine, based on skeleton key point data in the skeleton key point data set, a transverse boundary line in the target human body image. The selecting module is configured to select at least two pieces of skeleton key point data from the skeleton key point data set to form a reference skeleton key point data set. The second determining module is configured to determine, based on the reference skeleton key point data set, a longitudinal boundary line in the target human body image. The third determining module is configured to determine the target region as a region surrounded by the transverse boundary line and the longitudinal boundary line.

In some embodiments, the reference skeleton key point data set includes shoulder joint key point data and hip joint key point data. The second determining module includes a first determining sub-module, a second determining sub-module, and a third determining sub-module. The first determining sub-module is configured to determine, based on the shoulder joint key point data and the hip joint key point data, a longitudinal central line of the target human body image. The second determining sub-module is configured to determine a distance between a position represented by the shoulder joint key point data and a position represented by the hip joint key point data, and determine a reference distance based on the determined distance. The third determining sub-module is configured to determine, on each of two sides of the longitudinal central line, a straight line at the reference distance from the longitudinal central line as the longitudinal boundary line.

In some embodiments, the apparatus further includes a third determining unit, a fourth determining unit, and a fitting unit. The third determining unit is configured to determine at least two pieces of target reference skeleton key point data from the reference skeleton key point data set, and acquire abscissas included in the target reference skeleton key point data. The fourth determining unit is configured to transform the abscissas in the target reference skeleton key point data based on a predetermined abscissa transformation formula. The fitting unit is configured to perform curve fitting on the abscissas in the target reference skeleton key point data and the transformed abscissas, to obtain a coordinate transformation table representing a correspondence between an abscissa in the skeleton key point data and a transformed abscissa.

In some embodiments, the transforming unit includes a fourth determining module, a fifth determining module, a transforming module, and a sixth determining module. The fourth determining module is configured to determine an initial transformed abscissa of the pixel point based on the coordinate transformation table. The fifth determining module is configured to determine a region containing the pixel point in the target human body image, and determine a transformation coefficient corresponding to the region containing the pixel point, where a correspondence between the region containing the pixel point and the transformation coefficient is set in advance. The transforming module is configured to transform the initial transformed abscissa of the pixel point based on the determined transformation coefficient, to obtain a final transformed abscissa of the pixel point. The sixth determining module is configured to determine the final transformed abscissa of the pixel point and an ordinate of the pixel point as the transformed coordinate of the pixel point.

In some embodiments, the apparatus further includes a reshaping unit, which is configured to reshape the target region based on the obtained transformed coordinate, to obtain a reshaped human body image.

In a third aspect, an electronic device is provided according to embodiments of the present disclosure. The electronic device includes one or more processors and a storage device storing one or more programs. The one or more programs, when being executed by the one or more processors, cause the one or more processors to perform the method described in any embodiments in the first aspect.

In a fourth aspect, a computer readable medium is provided according to embodiments of the present disclosure. The computer readable medium stores computer programs. The computer programs is used to, when being executed by a processor, perform the method described in the first aspect.

With the method and the apparatus for processing an image according to embodiments of the present disclosure, the skeleton key point data set is determined from the acquired target human body image. Then the target region in the target human body image is determined based on the skeleton key point data set. Finally, the coordinate transformation is performed on each of the pixel points included in the target region, to generate the transformed coordinate of the pixel point. In this way, different coordinate transformations may be performed on pixel points of different regions in the target human body image, thereby improving flexibility of performing the coordinate transformation on pixel points.

BRIEF DESCRIPTION OF THE DRAWINGS

Other features, objectives and advantages of the present disclosure will become clearer by reading the detailed description of non-restrictive embodiments with reference to the drawings.

DETAILED DESCRIPTION OF EMBODIMENTS

The present disclosure is described in detail below through embodiments with reference to the drawings. It should be understood that the specific embodiments described herein are used to only explain instead of limiting the technical solution. It should be further noted that, for a brief description, the drawings only show parts related to the present disclosure.

It should be noted that, embodiments and features in embodiments of the present disclosure may be combined with each other as long as there is no conflict. The technical solutions are described in detail below through embodiments with reference to the drawings.

Figure 1:
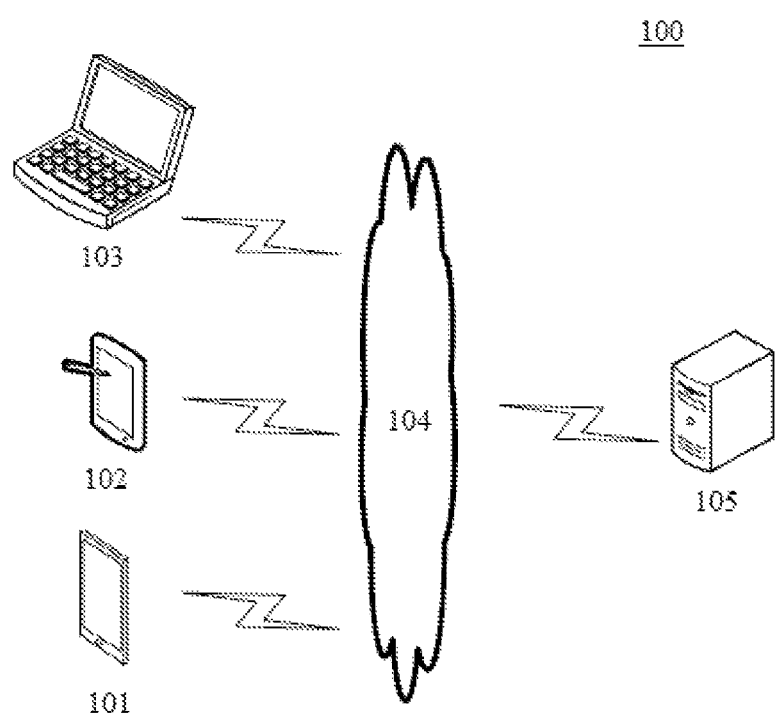
FIG. 1 is a schematic diagram showing a system architecture to which an embodiment of the present disclosure is applied.

FIG. 1 schematically shows a system architecture 100 to which a method or an apparatus for processing an image according to an embodiment of the present disclosure may be applied.

As shown in FIG. 1, the system architecture 100 may include terminal devices 101, 102 and 103, a network 104, and a server 105. The network 104 is a medium used to provide a communications link between the terminal devices 101, 102, 103 and the server 105. The network 104 may be implemented by various types of connections, such as a wired communications link, a wireless communications link, or an optical fiber cable.

A user may use the terminal devices 101, 102, and 103 to interact with the server 105 via the network 104, to receive or transmit a message. Various applications, such as image processing applications, video playing applications and social applications, may be installed on the terminal devices 101, 102, and 103.

Each of the terminal devices 101, 102, and 103 may be implemented by hardware or software. In the case of being implemented by hardware, the terminal devices 101, 102, and 103 may be various electronic devices having display screens and supporting image display. The various electronic devices may include but are not limited to a smartphone, a tablet computer, an e-book reader, an MP3 (moving picture experts group audio layer III) player, an MP4 (moving picture experts group audio layer IV) player, a laptop computer, a desk computer and the like. In a case of being implemented by software, the terminal devices 101, 102, and 103 may be installed on the above electronic devices. The terminal devices 101, 102, and 103 may be implemented by multiple software or software modules (for example, software or software modules for providing distributed services), or may be implemented by single software or software module, which is not limited herein.

The server 105 may be a server for providing various services, such as a background image processing server for processing images uploaded by the terminal devices 101, 102, and 103. The background image processing server may process a received image and obtain a processing result (such as a transformed coordinate of a pixel point).

It should be noted that, the method for processing an image according to the embodiments of the present disclosure may be performed by the server 105 or the terminal devices 101, 102, and 103. Accordingly, the apparatus for processing an image may be arranged in the server 105 or the terminal devices 101, 102, and 103.

It should be noted that, the server may be implemented by hardware or software. In a case of being implemented by hardware, the server may be implemented by a distributed server cluster including multiple servers or may be implemented by a single server. In a case of being implemented by software, the server may be implemented by multiple software or software modules (for example, software or software modules for providing distributed services), or may be implemented by single software or software module, which is not limited herein.

It should be understood that, FIG. 1 only shows illustrative numbers of the terminal devices, the network, and the server. Based on actual demands, there may be any numbers of the terminal devices, the network, and the server. In a case that a target human body image is not acquired remotely, the above system architecture may not include the network, but include only the terminal device or the server.

Figure 2:
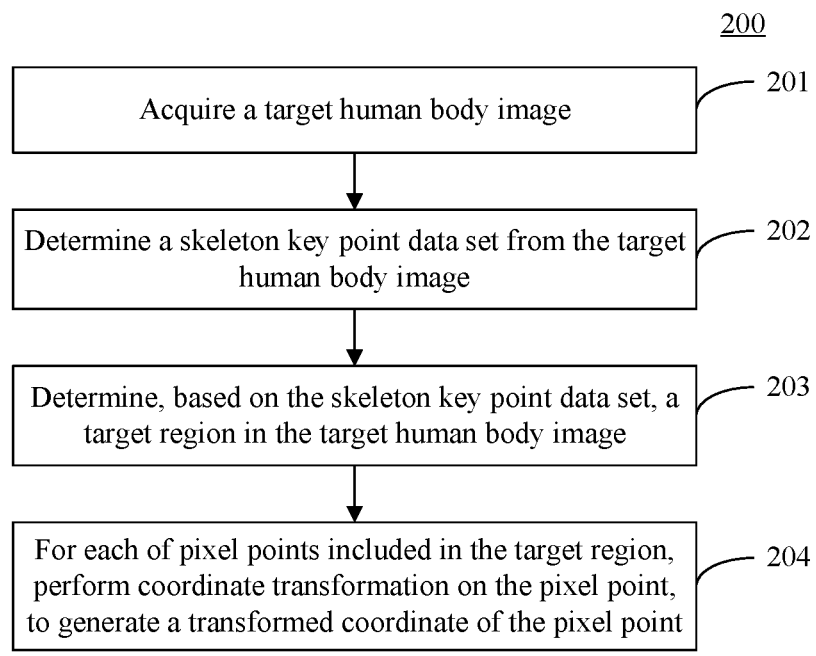
FIG. 2 is a flowchart of a method for processing an image according to an embodiment of the present disclosure.

Reference is made to FIG. 2, which show a process 200 of a method for processing an image according to an embodiment of the present disclosure. The method for processing an image includes the following steps 201 to 204.

In step 201, a target human body image is acquired.

In this embodiment, an execution subject (for example, the server or one of the terminal devices shown in FIG. 1) of the method for processing an image may acquire the target human body image remotely or locally in a wired or wireless manner. The target human body image may be a human body image obtained by a pre-arranged camera (for example, a camera included in the execution subject or in communication connection with the execution subject) shooting a target human (for example, the user using the execution subject, or another person). It should be noted that, the target human body image may be an individual image, or may be an image frame extracted from a video, such as a currently displayed image frame in a video played on the execution subject.

In step 202, a skeleton key point data set is determined from the target human body image.

In this embodiment, the execution subject may determine the skeleton key point data set of the acquired target human body image. Skeleton key point data is used to represent positions of skeleton key points (points indicating certain parts such as a head top, an elbow joint, and a shoulder joint) of a human body shown in the target human body image. The skeleton key point data may include coordinates in a coordinate system established on the target human body image. The coordinates may represent positions of the skeleton key points in the target human body image.

In this embodiment, the execution subject may determine the skeleton key point data set from the acquired target human body image by using any existing methods for determining skeleton key points in a human body image. For example, the execution subject may input the target human body image to a pre-trained convolutional neural network, to obtain the skeleton key point data set of the acquired target human body image. It should be noted that, the methods for determining skeleton key points in a human body image are well-known technologies that are widely studied and used currently, and thus are not described in detail herein.

In step 203, a target region in the target human body image is determined based on the skeleton key point data set.

In this embodiment, the execution subject may determine, based on the skeleton key point data set obtained in step 202, the target region in the target human body image. The target region may be an image region including pixel points to be subjected to coordinate transformation. The execution subject may determine the target region in various manners. For example, the execution subject may determine the target region as a region including all of the skeleton key points of the target human body image. Alternatively, the execution subject may determine the target region as a region including part of skeleton key points of the target human body image (for example, a region representing a torso of the human body).

In some optional implementations of this embodiment, the execution subject may determine, based on the skeleton key point data set, the target region in the target human body image by performing the following steps one to four.

In step one, a transverse boundary line in the target human body image is determined based on skeleton key point data in the skeleton key point data set. Specifically, there may be two transverse boundary lines. All or part of the skeleton key points may be included between the two transverse boundary lines. In an example, the execution subject may determine a transverse straight line above a skeleton key point representing a head top of the human body and at a first predetermined distance from the skeleton key point representing the head top of the human body as one transverse boundary line, and determine a transverse straight line below a skeleton key point representing a foot of the human body and at a second predetermined distance from the skeleton key point representing the foot of the human body as the other transverse boundary line. In another example, the execution subject may determine the two transverse boundary lines based on technician-specified positions, such that skeleton key points representing the torso of the human body are included between the two transverse boundary lines.

In step two, at least two pieces of skeleton key point data are selected from the skeleton key point data set, to form a reference skeleton key point data set. Generally, the skeleton key points have corresponding serial numbers. The execution subject may select, based on technician-specified serial numbers, at least two pieces of skeleton key point data from the skeleton key point data set, to form the reference skeleton key point data set. Generally, the reference skeleton key point data may be skeleton key point data representing the torso of the human body, such as skeleton key point data representing the shoulder joint or skeleton key point data representing a hip joint.

In step three, a longitudinal boundary line in the target human body image is determined based on the reference skeleton key point data set. Specifically, there may be two longitudinal boundary lines. The skeleton key points represented by the reference skeleton key point data may be included between the two longitudinal boundary lines. In an example, the execution subject may determine the two longitudinal boundary lines based on a technician-specified distance between a longitudinal boundary line and a reference skeleton key point.

Figure 3:
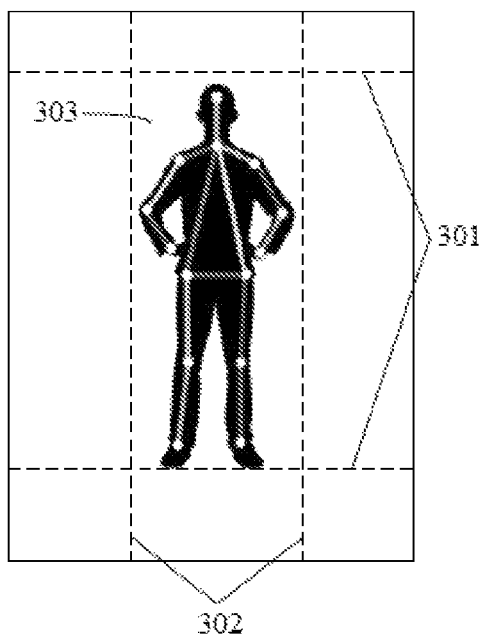
FIG. 3 is a schematic diagram showing a target region in a target human body image used in a method for processing an image according to an embodiment of the present disclosure.

In step four, a region surrounded by the transverse boundary line and the longitudinal boundary line is determined as the target region. As shown in FIG. 3, a region 303 surrounded by two transverse boundary lines 301 and two longitudinal boundary lines 302 is determined as the target region.

Figure 4A:
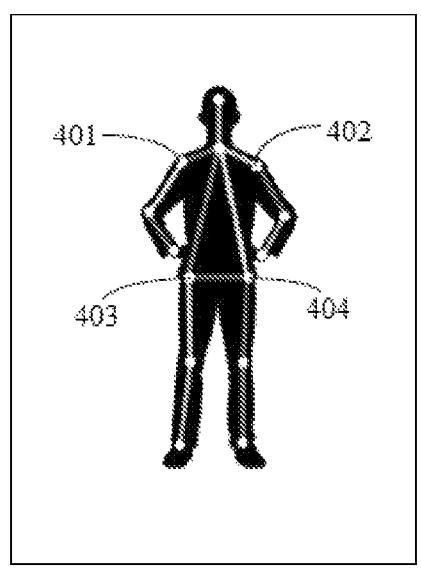
FIG. 4A is a schematic diagram showing shoulder joint key points and hip joint key points that are used in a method for processing an image according to an embodiment of the present disclosure.

In some optional implementations of this embodiment, the reference skeleton key point data set includes shoulder joint key point data and hip joint key point data. The shoulder joint key point data is used to represent a position of a shoulder joint key point in the target human body image. The hip joint key point data is used to represent a position of a hip joint key point in the target human body image. As shown in FIG. 4A, 401 and 402 denotes the shoulder joint key points, and 403 and 404 denotes the hip joint key points. The execution subject may determine the longitudinal boundary line in the target human body image by performing the following steps.

Firstly, a longitudinal central line of the target human body image is determined based on the shoulder joint key point data and the hip joint key point data. Specifically, the execution subject may determine the longitudinal boundary line in various manners. In an example, the execution subject may determine a central point as an intersection point of two diagonal lines of a quadrilateral form by the four points 401, 402, 403, and 404 shown in FIG. 4A serving as vertex points, and determine a longitudinal straight line passing through the central point as the longitudinal central line.

In another example, assuming that coordinates of the four points 401, 402, 403, and 404 in the target human body image are expressed as $(x1, y1)$, $(x2, y2)$, $(x3, y3)$ and $(x4, y4)$ respectively, and a coordinate of the central point is expressed as $(x0, y0)$, a relationship between the coordinate of the central point and the coordinates of the four points 401, 402, 403, and 404 may be expressed as $x0=(x1+x2+x3+x4)/4$, and $y0=(y1+y2+y3+y4)/4$. Then a longitudinal straight line passing through the central point is determined as the longitudinal central line.

Figure 4B:
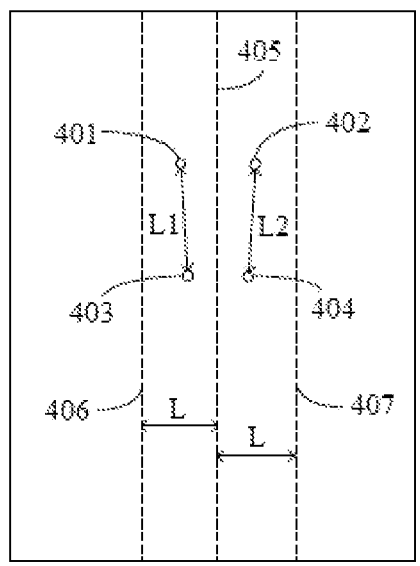
FIG. 4B is a schematic diagram showing longitudinal boundary lines and a longitudinal central line that are used in a method for processing an image according to an embodiment of the present disclosure.

Then, a distance between the position represented by the shoulder joint key point data and the position represented by the hip joint key point data is determined, and based on the determined distance, a reference distance is determined. Specifically, as shown in FIG. 4B, there are two shoulder joint key points and two hip joint key points, and thus two distances L1 and L2 are obtained. The distance L1 is the distance between the shoulder joint key point 401 and the hip joint key point data 403. The distance L2 is the distance between the shoulder joint key point 402 and the hip joint key point data 404. Subsequently, the execution subject may determine, based on the obtained distances, the reference distance in various manners. For example, an average of the distance L1 and the distance L2 may be determined as the reference distance. Alternatively. The reference distance is determined as $(L1+L2)/4$.

Finally, on each of two sides of the longitudinal central line, a straight line at the reference distance from the longitudinal central line is determined as the longitudinal boundary line. As shown in FIG. 4B, the determined longitudinal central line is denoted by 405. Each of longitudinal boundary lines 406 and 407 is at the reference distance L from the longitudinal central line 405.

In step 204, for each of the pixel points included in the target region, the coordinate transformation is performed on the pixel point, to generate a transformed coordinate of the pixel point.

In this embodiment, for each of the pixel points included in the target region, the execution subject may perform the coordinate transformation on the pixel point, to generate a transformed coordinate of the pixel point. In an example, a technician may pre-create, in the execution subject, a correspondence table representing a correspondence between a coordinate and a transformed coordinate of the pixel point in the target region. The execution subject may, for each of the pixel points, search the correspondence table for a transformed coordinate corresponding to the pixel point, to generate the transformed coordinate of the pixel point. Alternatively, a coordinate of each of the pixel points is transformed based on a technician-preset transformation distance, such that a position indicated by the transformed coordinate of the pixel point is at the transformation distance from a position indicated by the coordinate of the pixel point.

In some optional implementations of this embodiment, after performing step 204, the execution subject may reshape the target region based on the obtained transformed coordinate, to obtain a reshaped human body image. In an example, the reshaped human body image may be an image obtained by thinning some parts of the human body, such as a leg, a face and a waist (that is, processes such as a body slimming process and a face slimming process).

The execution subject may reshape, based on the obtained transformed coordinate, the target region in various manners. In an example, the execution subject may replace a color value of a pixel point indicated by the obtained transformed coordinate with a color value of the pixel point indicated by the original coordinate corresponding to the transformed coordinate. For example, assuming a coordinate of a pixel point is expressed as (x0, y0) and a color value of the pixel point is denoted by C, and a transformed coordinate of the pixel point is expressed as (x1, y1), the execution subject replaces a color value of the pixel point of the coordinate expressed as (x1, y1) with the color value C. It should be noted that, the execution subject may reshape, based on the obtained transformed coordinate of each of the pixel points, the target human body image by using existing image processing methods, such as zooming out, zooming in, or translating an image, so as to obtain the reshaped human body image.

Figure 5:
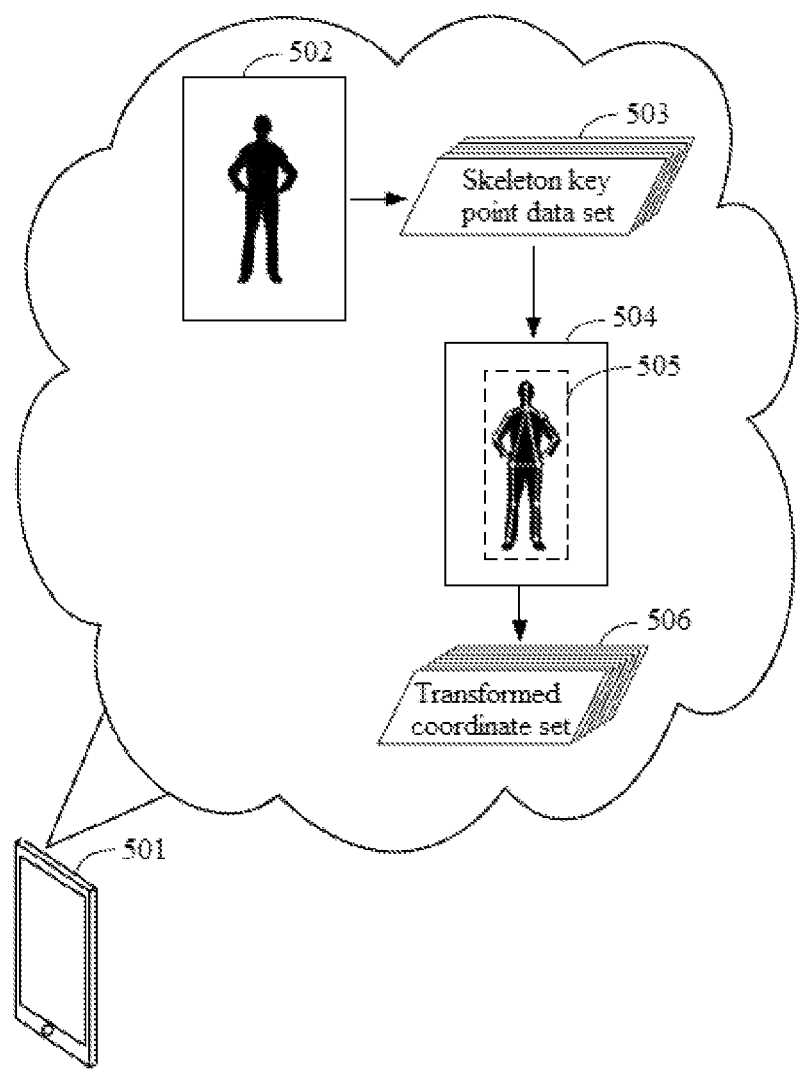
FIG. 5 is a schematic diagram showing an application scenario of a method for processing an image according to an embodiment of the present disclosure.

Reference is made to FIG. 5, which is a schematic diagram showing an application scenario of the method for processing an image according to this embodiment. In the application scenario shown in FIG. 5, a terminal device 501 firstly acquires a target human body image 502, and then determines a skeleton key point data set 503 from the target human body image by using a pre-trained convolutional neural network. Skeleton key point data is used to represent positions of skeleton key points (as shown in an image 504 including marked skeleton key points in FIG. 5) in the target human body image 502. Then, the terminal device 501 determines a region including skeleton key points indicated by all of the skeleton key point data as a target region 505. Next, the terminal device 501 performs coordinate transformation on each of pixel points included in the target region 505 (for example, a coordinate of each of the pixel points is transformed based on a technician-preset transformation distance, such that a position indicated by the transformed coordinate of the pixel point is at the transformation distance from a position indicated by the original coordinate of the pixel point), to finally generate a transformed coordinate set 506 formed by the transformed coordinate of each of the pixel points.

With the method according to the above embodiments of the present disclosure, the skeleton key point data set is determined from the acquired target human body image. Then the target region in the target human body image is determined based on the skeleton key point data set. Finally, the coordinate transformation is performed on each of the pixel points included in the target region, to generate the transformed coordinate of the pixel point. In this way, different coordinate transformations may be performed on pixel points of different regions in the target human body image, thereby improving flexibility of performing the coordinate transformation on pixel points.

Figure 6:
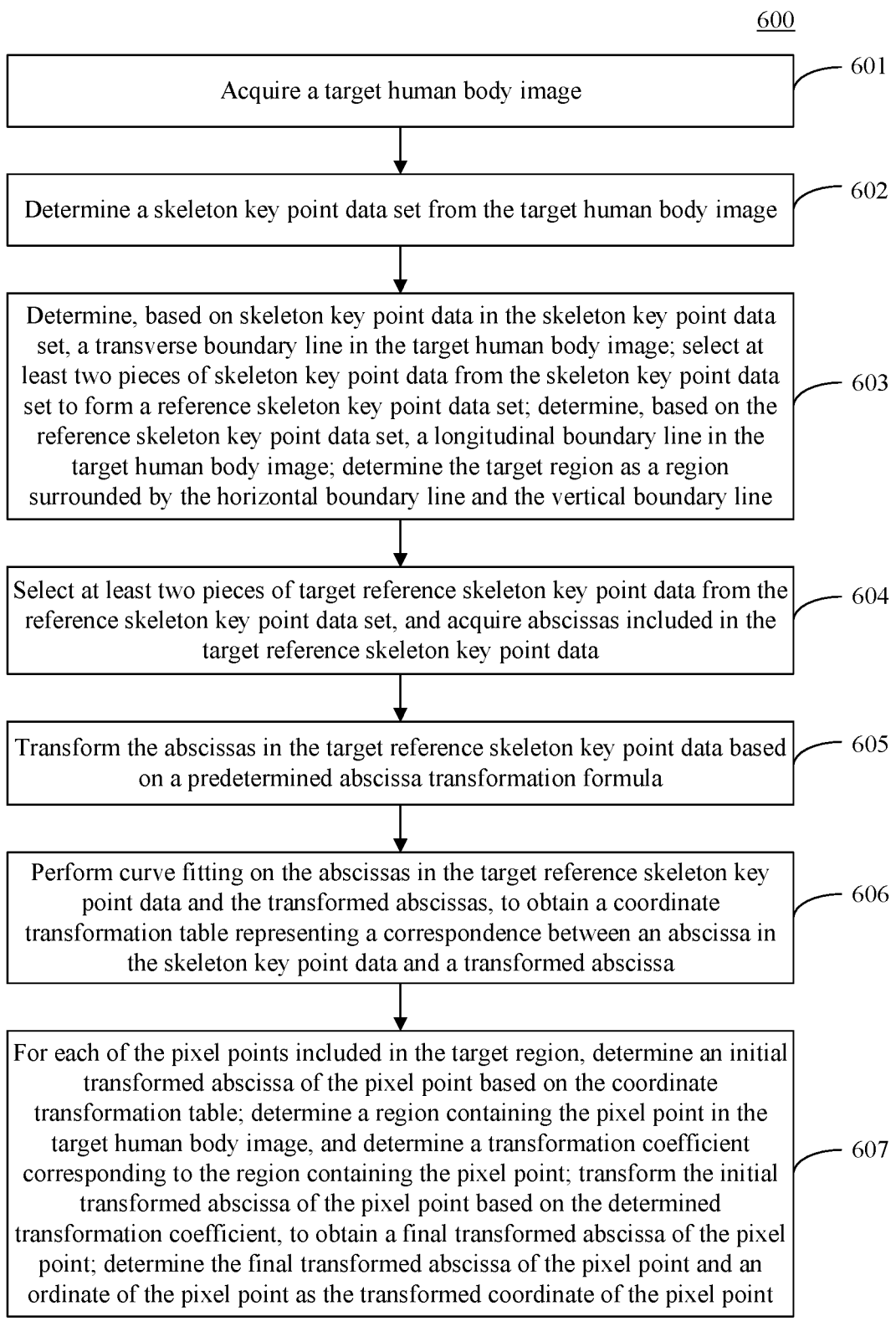
FIG. 6 is a flowchart of a method for processing an image according to another embodiment of the present disclosure.

Reference is made to FIG. 6, which shows a process 600 of a method for processing an image according to another embodiment of the present disclosure. The process 600 of the method for processing an image includes the following steps 601 to 607.

In step 601, a target human body image is acquired.

In this embodiment, step 601 is basically the same as step 201 in the embodiment described with reference to FIG. 2, and is not described in detail herein.

In step 602, a skeleton key point data set is determined from the target human body image.

In this embodiment, step 602 is basically the same as step 202 in the embodiment described with reference to FIG. 2, and is not described in detail herein.

In step 603, a transverse boundary line in the target human body image is determined based on skeleton key point data in the skeleton key point data set. At least two pieces of skeleton key point data are selected from the skeleton key point data set, to form a reference skeleton key point data set. A longitudinal boundary line in the target human body image is determined based on the reference skeleton key point data set. A region surrounded by the transverse boundary line and the longitudinal boundary line is determined as the target region.

In this embodiment, the execution subject may perform the following steps 6031 to 6034.

In step 6031, the transverse boundary line in the target human body image is determined based on the skeleton key point data in the skeleton key point data set. Specifically, there may be two transverse boundary lines. All or part of the skeleton key points may be included between the two transverse boundary lines.

In step 6032, at least two pieces of skeleton key point data are selected from the skeleton key point data set, to form a reference skeleton key point data set. Generally, the skeleton key points have corresponding serial numbers. The execution subject may select, based on technician-specified serial numbers, at least two pieces of skeleton key point data from the skeleton key point data set, to form the reference skeleton key point data set. Generally, the reference skeleton key point data may be skeleton key point data representing the torso of the human body, such as the skeleton key point data representing the shoulder joint or the skeleton key point data representing the hip joint.

In step 6033, a longitudinal boundary line in the target human body image is determined based on the reference skeleton key point data set. Specifically, there may be two longitudinal boundary lines. The skeleton key points represented by the reference skeleton key point data may be included between the two longitudinal boundary lines. In an example, the execution subject may set the two longitudinal boundary lines based on a technician-specified distance between a longitudinal boundary line and a reference skeleton key point.

In step 6034, a region surrounded by the transverse boundary line and the longitudinal boundary line is determined as the target region.

It should be noted that, steps 6031 to 6034 are basically the same as the optional implementations in step 203. For the contents relating to determination of the target region, one may refer to the optional implementations of step 203.

In step 604, at least two pieces of target reference skeleton key point data are selected from the reference skeleton key point data set, and abscissas in the target reference skeleton key point data are acquired.

In this embodiment, the execution subject may determine at least two pieces of technician-specified target reference skeleton key point data from the reference skeleton key point data set. Generally, the reference skeleton key point data has corresponding serial number. The execution subject may determine, based on the technician-specified serial numbers, at least two pieces of reference skeleton key point data from the reference skeleton key point data set, as the target reference skeleton key point data. Then, the execution subject may acquire the abscissas in the target reference skeleton key point data. In an example, the skeleton key points 401 and 402 shown in FIG. 4A may be determined as target reference skeleton key points indicated by the target reference skeleton key point data.

In step 605, the abscissas in the target reference skeleton key point data are transformed based on a predetermined abscissa transformation formula.

In this embodiment, the execution subject may transform the abscissas in the target reference skeleton key point data based on the predetermined abscissa transformation formula. In an example, assuming that the skeleton key points 401 and 402 shown in FIG. 4A are the target reference skeleton key points, the abscissa transformation formula may be expressed as $x1'=x1+\Delta x$ and $x2'=x2-\Delta x$, where x1 denotes an original abscissa of the skeleton key point 401, x1' denotes a transformed abscissa of the skeleton key point 401, x2 denotes an original abscissa of the skeleton key point 402, x2' denotes a transformed abscissa of the skeleton key point 402, and $\Delta x$ denotes a preset abscissa transformation distance.

In another example, assuming that the skeleton key points 401 and 402 shown in FIG. 4A are the target reference skeleton key points, the abscissa transformation formula may be expressed as:

$$\begin{cases} x1 = x1' \times (1-L')/(1-L) \\ x2 = x1 + L' \\ L = x2' - x1' \\ L' = L \times r \end{cases}$$

where x1 denotes an original abscissa of the skeleton key point 401, x1' denotes a transformed abscissa of the skeleton key point 401, x2 denotes an original abscissa of the skeleton key point 402, x2' denotes a transformed abscissa of the skeleton key point 402, L denotes a distance between transformed abscissas obtained by scaling, based on a technician-preset scale value, a difference between the original abscissa x2 and the original abscissa x1, r denotes a preset transformation coefficient corresponding to a region in which the skeleton key points 401 and 402 are located, and L' denotes a distance obtained by transforming the distance L based on the transformation coefficient.

Generally, x1 and x2 denote abscissas after being normalized (for example, x1 and x2 may be expressed as $x1=x10/(x_{max}-x_{min})$ and $x2=x20/(x_{max}-x_{min})$ respectively, where x10, denotes an actual abscissa of the skeleton key point 401 in the target image, x20, denotes an actual abscissa of the skeleton key point 402 in the target image, $x_{max}$ denotes a maximum among actual abscissas of the pixel points included in the target region, and $x_{min}$ denotes a minimum among the actual abscissas of the pixel points included in the target region. After being normalized, the abscissas of the pixel points included in the target region are mapped in an interval of [0, 1], and thus the distance L and the distance L' in the above formula are both less than 1 and greater than 0. As shown in FIG. 4B, an abscissa of a pixel point located on the longitudinal boundary line 406 may be set as 0, and an abscissa of a pixel point located on the longitudinal boundary line 407 may be set as 1.

Two groups of abscissas (x1', x1) and (x2', x2) are obtained by using the abscissa transformation formula in this step.

In step 606, curve fitting is performed on the abscissas in the target reference skeleton key point data and the transformed abscissas, to obtain a coordinate transformation table representing a correspondence between an abscissa in the skeleton key point data and a transformed abscissa.

In this embodiment, the execution subject may perform the curve fitting on the abscissas in the target reference skeleton key point data and the transformed abscissas, to obtain the coordinate transformation table representing the correspondence between the abscissa and the transformed abscissa of the skeleton key point data. Specifically, the execution subject may perform the curve fitting by using the two groups of abscissas (x1', x1) and (x2', x2) obtained in step 605, a minimum among abscissas of the pixel points included in the target region (for example, the minimum $x_{min}$ or the value '0' obtained after being normalized), and a maximum among abscissas of the pixel points included in the target region (for example, the maximum $x_{max}$ or the value '1' obtained after being normalized), to obtain the coordinate transformation table. The coordinate transformation table may represent the correspondence between the abscissa and the transformed abscissa of the skeleton key point data. Generally, a fitted curve may be drawn by using the coordinate transformation table. It should be noted that, the execution subject may perform the curve fitting in various manners, such as quadratic curve fitting, cubic curve fitting, and third order Bezier curve fitting, which are well-known technologies that are widely studied and used currently, and thus are not described in detail herein.

Figure 7:
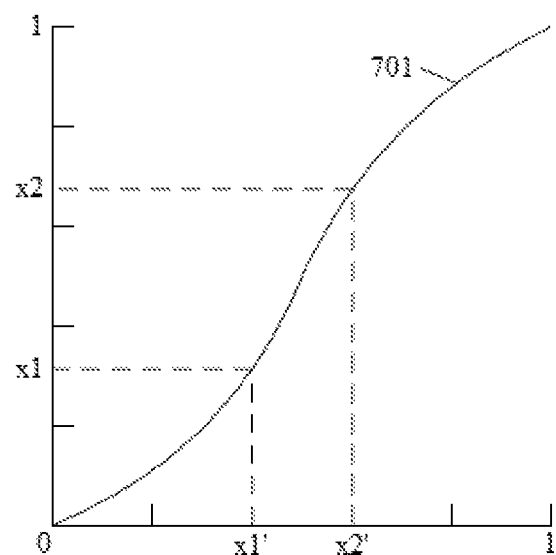
FIG. 7 is a schematic diagram showing a fitted curve obtained by performing curve fitting on abscissas in target reference skeleton key point data and transformed abscissas, in a method for processing an image according to an embodiment of the present disclosure.

As an example, FIG. 7 shows a fitted curve 701 obtained by using an existing application (for example, Photoshop) to perform curve fitting on the original abscissas in the target reference skeleton key point data and the transformed abscissas. A longitudinal axis of a coordinate system of the curve 701 represents values of normalized abscissas of the pixel points included in the target region, and a transverse axis of the coordinate system represents the corresponding transformed abscissas. As shown in FIG. 7, a difference between the abscissas in the target reference skeleton key point data is reduced from a value of x2−x1 to a value of x2'− x1'.

In step 607, for each of the pixel points included in the target region, an initial transformed abscissa of the pixel point is determined based on the coordinate transformation table. A region containing the pixel point in the target human body image is determined, and a transformation coefficient corresponding to the region containing the pixel point is determined. The initial transformed abscissa of the pixel point is transformed based on the determined transformation coefficient, to obtain a final transformed abscissa of the pixel point. The final transformed abscissa of the pixel point and an ordinate of the pixel point are determined as the transformed coordinate of the pixel point.

In this embodiment, for each of the pixel points included in the target region, the execution subject may perform the following steps.

First, the initial transformed abscissa of the pixel point is determined based on the coordinate transformation table obtained in step 606. The execution subject may use the abscissa of the pixel point to search the coordinate transformation table, to obtain a transformed abscissa of the pixel point as the initial transformed abscissa.

Then, a region containing the pixel point in the target human body image is determined, and a transformation coefficient corresponding to the region containing the pixel point is determined. A correspondence between the transformation coefficient and the region containing the pixel point may be set in advance. For example, a correspondence table representing correspondences between different regions and different transformation coefficients may be set in the execution subject in advance. The different regions may be represented as ranges of ordinates of the pixel points included in the target region. For example, the ordinates of the pixel points included in the target region are mapped in the interval of [0, 1], and the interval of [0, 1] is evenly divided into N (N is a positive integer) subintervals, where each of the N subintervals corresponds to one transformation coefficient. By setting different transformation coefficients, the pixel points located at different longitudinal positions in the target region can be processed by different reshaping processes of different extents. For example, if a small transformation coefficient is set for a head region in the target human body image, the head region is reshaped to a small extent.

After that, the initial transformed abscissa of the pixel point is transformed based on the determined transformation coefficient, to obtain a final transformed abscissa of the pixel point. In an example, the execution subject may obtain the final transformed abscissa by using the following formula:

$$\begin{cases} x = (x0' - x0) \times r + x0, & x0 < 0.5 \\ x = x0 & x0 = 0.5 \\ x = x0 - (x0 - x0') \times r, & x0 > 0.5 \end{cases}$$

where x denotes a final transformed abscissa of the pixel point, x0 denotes an original abscissa of the pixel point, x0' denotes an initial transformed abscissa of the pixel point, and r denotes a transformation coefficient corresponding to the pixel point. It should be understood that the abscissas denoted by x0, x0' and x are normalized abscissas. The execution subject may transform the obtained abscissa x into an actual abscissa in the target human body image.

At last, the final transformed abscissa of the pixel point and the ordinate of the pixel point are determined as the transformed coordinate of the pixel point.

As shown in FIG. 6, in this embodiment, the step of obtaining the coordinate transformation table based on the reference skeleton key point data set and performing the coordinate transformation based on the coordinate transformation table is improved in the process 600 of the method for processing an image compared with the embodiment shown in FIG. 2. Therefore, with the technical solutions provided in this embodiment, the flexibility of performing the coordinate transformation can be further improved, such that pixel points in different target regions can be processed by different reshaping processes of different extents, thereby improving display effect of the target human body image.

Figure 8:
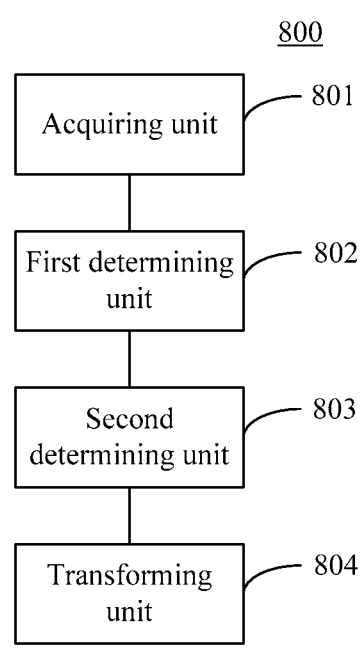
FIG. 8 is a schematic structural diagram of an apparatus for processing an image according to an embodiment of the present disclosure.

Reference is made to FIG. 8, an apparatus for processing an image is provided according to an embodiment of the present disclosure, to execute the method described with reference to the above drawings. The apparatus in this embodiment corresponds to the method as shown in FIG. 2. The apparatus is applicable to various electronic devices.

As shown in FIG. 8, an apparatus 800 for processing an image includes an acquiring unit 801, a first determining unit 802, a second determining unit 803, and a transforming unit 804. The acquiring unit 801 is configured to acquire a target human body image. The first determining unit 802 is configured to determine a skeleton key point data set from the target human body image. The second determining unit 803 is configured to determine, based on the skeleton key point data set, a target region in the target human body image. The transforming unit 804 is configured to, for each of pixel points included in the target region, perform coordinate transformation on the pixel point, to generate a transformed coordinate of the pixel point.

In this embodiment, the acquiring unit 801 may acquire the target human body image remotely or locally in a manner of wired connection or wireless connection. The target human body image may be a human body image obtained with a predetermined camera (for example, a camera included in the apparatus 800 or in communication connection with the apparatus 800) shooting a target human (for example, the user using the apparatus 800 or another person). It should be noted that, the target human body image may be an individual image or may be an image frame extracted from a video, such as a currently displayed image frame in a video played on the apparatus 800.

In this embodiment, the first determining unit 802 may determine the skeleton key point data set from the acquired target human body image. Skeleton key point data is used to represent positions of skeleton key points (points indicating certain parts such as a head top, an elbow joint, and a shoulder joint) of a human body shown in the target human body image. The skeleton key point data may include coordinates in a coordinate system established on the target human body image. The coordinates may represent positions of the skeleton key points in the target human body image.

In this embodiment, the first determining unit 802 may determine the skeleton key point data set from the target human body image by using any existing methods for determining skeleton key points in a human body image. For example, the first determining unit 802 may input the target human body image to a pre-trained convolutional neural network, to obtain the skeleton key point data set of the target human body image. It should be noted that, the methods for determining skeleton key points in a human body image are well-known technologies that are widely studied and used currently, and thus are not described in detail herein.

In this embodiment, the second determining unit 803 may determine, based on the skeleton key point data set obtained by the first determining unit 802, the target region in the target human body image. The target region may be an image region including pixel points to be subjected to coordinate transformation. The second determining unit 803 may determine the target region in various manners. For example, the second determining unit 803 may determine the target region as a region including all of the skeleton key points of the human body image. Alternatively, the second determining unit 803 may determine the target region as a region including part of skeleton key points of the human body image (for example, a region representing a torso of the human body).

In this embodiment, for each of the pixel points included in the target region, the transforming unit 804 may perform the coordinate transformation on the pixel point, to generate a transformed coordinate of the pixel point. In an example, a technician may pre-create, in the apparatus 800, a correspondence table representing a correspondence between a coordinate and a transformed coordinate of the pixel point in the target region. For each of the pixel points, the transforming unit 804 may search the correspondence table for a transformed coordinate corresponding to the pixel point, to generate the transformed coordinate of the pixel point. Alternatively, a coordinate of each of the pixel points is transformed based on a technician-preset transformation distance, such that a position indicated by the transformed coordinate of the pixel point is at the above transformation distance from a position indicated by the coordinate of the pixel point.

In some optional implementations of this embodiment, the second determining unit may include a first determining module (not shown in the drawings), a selecting module, a second determining module (not shown in the drawings), and a third determining module. The first determining module is configured to determine, based on skeleton key point data in the skeleton key point data set, a transverse boundary line in the target human body image. The selecting module is configured to select at least two pieces of skeleton key point data from the skeleton key point data set to form a reference skeleton key point data set. The second determining module is configured to determine, based on the reference skeleton key point data set, a longitudinal boundary line in the target human body image. The third determining module is configured to determine the target region as a region surrounded by the transverse boundary line and the longitudinal boundary line.

In some optional implementations of this embodiment, the reference skeleton key point data set includes shoulder joint key point data and hip joint key point data. The second determining module may include a first determining sub-module (not shown in the drawings), a second determining sub-module (not shown in the drawings), and a third determining sub-module (not shown in the drawings). The first determining sub-module is configured to determine, based on the shoulder joint key point data and the hip joint key point data, a longitudinal central line of the target human body image. The second determining sub-module is configured to determine a distance between a position represented by the shoulder joint key point data and a position represented by the hip joint key point data, and determine a reference distance based on the determined distance. The third determining sub-module is configured to determine, on each of two sides of the longitudinal central line, a straight line at the reference distance from the longitudinal central line as the longitudinal boundary line.

In some optional implementations of this embodiment, the apparatus 800 further includes a third determining unit (not shown in the drawings), a fourth determining unit (not shown in the drawings), and a fitting unit (not shown in the drawings). The third determining unit is configured to determine at least two pieces of target reference skeleton key point data from the reference skeleton key point data set, and acquire abscissas in the target reference skeleton key point data. The fourth determining unit is configured to transform the abscissas in the target reference skeleton key point data based on a predetermined abscissa transformation formula. The fitting unit is configured to perform curve fitting on the abscissas in the target reference skeleton key point data and the transformed abscissas, to obtain a coordinate transformation table representing a correspondence between an abscissa in the skeleton key point data and a transformed abscissa.

In some optional implementations of this embodiment, the transforming unit may include a fourth determining module (not shown in the drawings), a fifth determining module (not shown in the drawings), a transforming module (not shown in the drawings), and a sixth determining module (not shown in the drawings). The fourth determining module is configured to determine an initial transformed abscissa of the pixel point based on the coordinate transformation table. The fifth determining module is configured to determine a region containing the pixel point in the target human body image, and determine a transformation coefficient corresponding to the region containing the pixel point, where a correspondence between the region containing the pixel point and the transformation coefficient is set in advance. The transforming module is configured to transform the initial transformed abscissa of the pixel point based on the determined transformation coefficient, to obtain a final transformed abscissa of the pixel point. The sixth determining module is configured to determine the final transformed abscissa of the pixel point and an ordinate of the pixel point as the transformed coordinate of the pixel point.

In some optional implementations of this embodiment, the apparatus 800 may further include a reshaping unit (not shown in the drawings), which is configured to reshape the target region based on the obtained transformed coordinate, to obtain a reshaped human body image.

With the apparatus according to the above embodiments of the present disclosure, the skeleton key point data set is determined from the acquired target human body image. Then the target region in the target human body image is determined based on the skeleton key point data set. Finally, the coordinate transformation is performed on each of the pixel points included in the target region, to generate the transformed coordinate of the pixel point. In this way, different coordinate transformations may be performed on pixel points of different regions in the target human body image, thereby improving flexibility of performing the coordinate transformation on pixel points.

Figure 9:
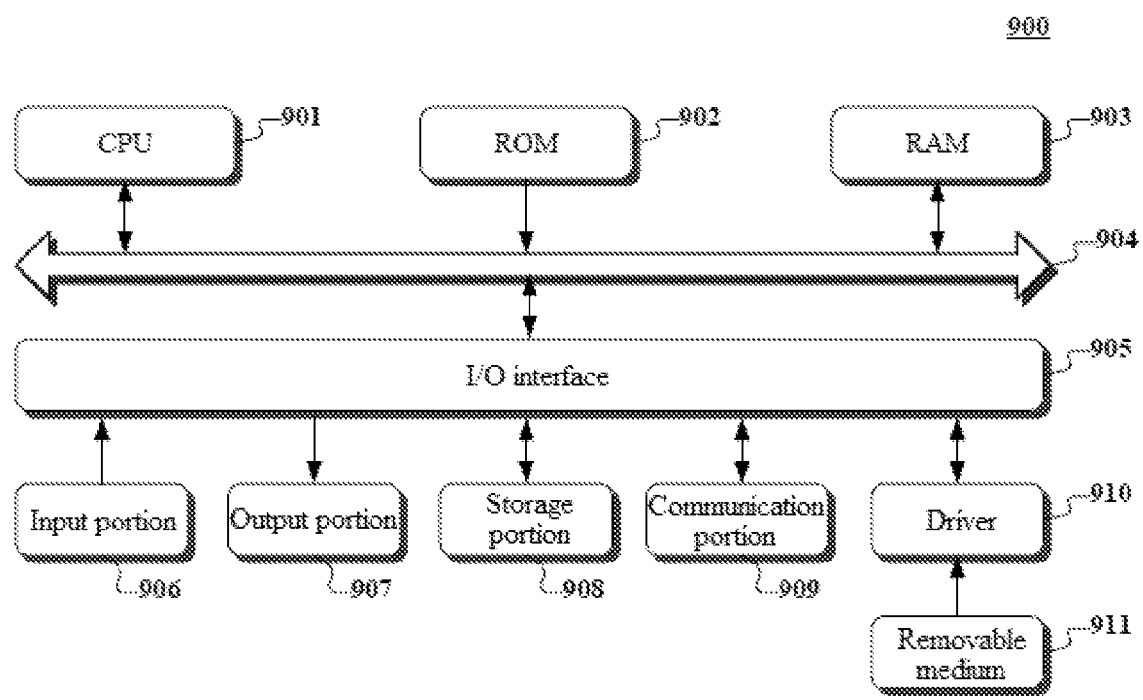
FIG. 9 is a schematic structural diagram of a computer system applicable to implement an electronic device according to an embodiment of the present disclosure.

Reference is made to FIG. 9, which is a schematic structural diagram of a computer system 900 applicable to implement an electronic device (for example, the server or one of the terminal devices shown in FIG. 1) according to an embodiment of the present disclosure. The electronic device shown in FIG. 9 is provided only for illustration rather than limitation to functions and applications of the embodiments of the present disclosure.

As shown in FIG. 9, the computer system 900 includes a central processing unit (CPU) 901. The CPU 901 may perform various proper operations and processing based on programs stored in a read-only memory (ROM) 902 or programs loaded from a storage portion 908 to a random-access memory (RAM) 903. The RAM 903 also stores various data and programs required for operations of the system 900. The CPU 901, the ROM 902, and the RAM 903 are connected to each other via a bus 904. An input/output (I/O) interface 905 is also connected to the bus 904.

The following components are connected to the I/O interface 905: an input portion 906 including a keyboard, a mouse or the like, an output portion 907 including a liquid crystal display (LCD), a speaker or the like, a storage portion 908 including a hard disk or the like, and a communication portion 909 including a network interface card such as a LAN card, a modem or the like. The communication portion 909 performs communication processing via a network such as the Internet. If necessary, a driver 910 may also be connected to the I/O interface 905. A removable medium 911 such as a magnetic disk, an optical disk, a magneto-optical disk, a semiconductor memory or the like is mounted on the driver 910 as necessary, such that a computer program read from the removable medium 911 is installed in the storage portion 908.

According to the embodiments of the present disclosure, the above processes described with reference to the flowcharts may be implemented as computer software programs. For example, a computer program product is provided according to an embodiment of the present disclosure. The computer program product includes a computer program carried by a computer readable medium. The computer program includes program codes for performing the method shown in the flowcharts. In this embodiment, the computer program may be downloaded and installed from Internet via the communication portion 909, and/or may be installed from the removable medium 911. The computer program, when being executed by the central processing unit (CPU) 901, can realize the above functions specified in the method in the present disclosure.

It should be noted that, the computer readable medium in the present disclosure may be a computer readable signal medium, a computer readable medium, or any combination thereof. The computer readable medium may be but is not limited to a system, apparatus, or device in an electronic, magnetic, optical, electromagnetic, infrared, or semi-conductive form, or any combination thereof. Specifically, the computer readable medium may be but is not limited to an electric connection having one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), a light storage device, a magnetic storage device or any combination thereof. In the present disclosure, the computer readable medium may be any tangible medium including or storing a program. The program may be used by or with a command execution system, apparatus or device. In the present disclosure, the computer readable signal medium may be a data signal transmitted in a baseband or transmitted as a part of a carrier wave, where the data signal carries computer readable program codes. The transmitted data signal may be in various forms, including but not limited to an electromagnetic signal, an optical signal or any proper combination thereof. The computer readable signal medium may further be any other computer readable medium than the above computer readable medium. The computer readable medium can send, transmit or transfer the program that is used by or with a command execution system, apparatus or device. Program codes stored in the computer readable medium may be transmitted via any proper medium including but not limited to wireless, a wire, an optical cable, RF and the like, or any proper combination thereof.

Computer program codes for executing operation of the present disclosure may be written in one or more programming languages or a combination thereof. The programming languages may include an object-oriented programming language such as Java, Smalltalk, C++, and may further include a conventional procedural programming language such as "C" or the like. The program codes may be completely or partly executed on a user computer, or executed as a standalone software package. Alternatively, one part of the program codes may be executed on a user computer and the other part of the program codes may be executed on a remote computer, or the program codes may be executed on a remote computer or a server completely. In a case that the program codes are executed on a remote computer completely or partly, the remote computer may be connected to the user computer via any network such as a local area network (LAN) or a wide area network (WAN). Alternatively, the remote computer may be directly connected to an external computer (for example, the remote computer is connected to the external computer via the Internet provided by an Internet service provider).

The flowcharts and the block diagrams illustrate system structures, functions and operations that may be implemented with the system, the method, and the computer program product according to the embodiments of the present disclosure. In this case, each block in the flowcharts or the block diagrams may represent a module, a program segment, or a part of codes. The module, the program segment, or the part of codes may include one or more executable instructions for implementing a specified logical function. It should be noted that, in some alternative implementations, the functions shown in blocks may be performed in an order different from that indicated in the drawings. For example, steps shown in two adjacent blocks may be performed almost in parallel, or may be performed in reverse order, which is determined based on the functions. It should be further noted that, a function shown in each block of the flowcharts and/or block diagrams, or shown in a combination of blocks of the flowcharts and/or block diagrams may be implemented by a hardware-based system dedicated for performing specified functions or operations, or may be implemented by a combination of a dedicated hardware and computer instructions.

The units involved in the embodiments of the present disclosure may be implemented by hardware or software. Alternatively, the units may be arranged in a processor. For example, it may be described as a processor including an acquiring unit, a first determining unit, a second determining unit, and a transforming unit. In some cases, names of the units are not intended to limit the units. For example, the acquiring unit may be described as a unit for acquiring a target human body image.

In another aspect, a computer readable medium is further provided in the present disclosure. The computer readable medium may be included in the electronic device as described in the above, or may be separated from the electronic device. The computer readable medium carries one or more programs. The one or more programs, when being executed by the electronic device, can cause the electronic device to perform the steps of: acquiring a target human body image; determining a skeleton key point data set from the target human body image; determining, based on the skeleton key point data set, a target region in the target human body image; and for each of pixel points included in the target region, performing coordinate transformation on the pixel point, to generate a transformed coordinate of the pixel point.

The above describes only preferred embodiments and technical principles used in the present disclosure. It should be understood by those skilled in the art that, the invention scope of the present disclosure is not limited to the technical solutions formed by the specific combinations of the above technical features, and should further cover other technical solutions formed by any combination of the above technical features or equivalent features of the above technical features without departing from the above invention concept, for example, technical solutions formed by interchanging the above features and the technical features having the similar functions as described (but not limited to those) in the present disclosure.

The invention claimed is:

1. A method for processing an image, comprising:
acquiring a target human body image;
determining a skeleton key point data set from the target human body image;
determining, based on the skeleton key point data set, a target region in the target human body image, wherein the determining, based on the skeleton key point data set, a target region in the target human body image comprises:
determining, based on skeleton key point data in the skeleton key point data set, a transverse boundary line in the target human body image,
selecting at least two pieces of skeleton key point data from the skeleton key point data set to form a reference skeleton key point data set, determining, based on the reference skeleton key point data set, a longitudinal boundary line in the target human body image, and determining the target region as a region surrounded by the transverse boundary line and the longitudinal boundary line; and for each of pixel points comprised in the target region, performing coordinate transformation on the pixel point, to generate a transformed coordinate of the pixel point.

2. The method according to claim 1, wherein the reference skeleton key point data set comprises shoulder joint key point data and hip joint key point data; and wherein the determining, based on the reference skeleton key point data set, a longitudinal boundary line in the target human body image comprises:

determining, based on the shoulder joint key point data and the hip joint key point data, a longitudinal central line of the target human body image;

determining a distance between a position represented by the shoulder joint key point data and a position represented by the hip joint key point data, and determining, based on the determined distance, a reference distance; and determining, on each of two sides of the longitudinal central line, a straight line at the reference distance from the longitudinal central line as the longitudinal boundary line.

3. The method according to claim 1, wherein before the for each of pixel points comprised in the target region, performing coordinate transformation on the pixel point, to generate a transformed coordinate of the pixel point, the method further comprises:

determining at least two pieces of target reference skeleton key point data from the reference skeleton key point data set, and acquiring abscissas comprised in the target reference skeleton key point data;

transforming the abscissas in the target reference skeleton key point data based on a predetermined abscissa transformation formula; and performing curve fitting on the abscissas in the target reference skeleton key point data and the transformed abscissas, to obtain a coordinate transformation table representing a correspondence between an abscissa in the skeleton key point data and a transformed abscissa.

4. The method according to claim 3, wherein the performing coordinate transformation on the pixel point, to generate a transformed coordinate of the pixel point comprises:

determining an initial transformed abscissa of the pixel point based on the coordinate transformation table;

determining a region containing the pixel point in the target human body image, and determining a transformation coefficient corresponding to the region containing the pixel point, wherein a correspondence between the region containing the pixel point and the transformation coefficient is set in advance;

transforming the initial transformed abscissa of the pixel point based on the determined transformation coefficient, to obtain a final transformed abscissa of the pixel point; and determining the final transformed abscissa of the pixel point and an ordinate of the pixel point as the transformed coordinate of the pixel point.

5. The method according to claim 1, wherein after the for each of pixel points comprised in the target region, performing coordinate transformation on the pixel point, to generate a transformed coordinate of the pixel point, the method further comprises:

reshaping the target region based on the obtained transformed coordinate, to obtain a reshaped human body image.

6. An apparatus for processing an image, comprising:

at least one processor; and at least one memory communicatively coupled to the at least one processor and storing instructions that upon execution by the at least one processor cause the apparatus to:

acquire a target human body image;

determine a skeleton key point data set from the target human body image;

determine, based on the skeleton key point data set, a target region in the target human body image;

for each of pixel points comprised in the target region, perform coordinate transformation on the pixel point, to generate a transformed coordinate of the pixel point;

wherein the at least one memory further stores instructions that upon execution by the at least one processor cause the apparatus to:

determine, based on skeleton key point data in the skeleton key point data set, a transverse boundary line in the target human body image;

select at least two pieces of skeleton key point data from the skeleton key point data set to form a reference skeleton key point data set;

determine, based on the reference skeleton key point data set, a longitudinal boundary line in the target human body image; and determine the target region as a region surrounded by the transverse boundary line and the longitudinal boundary line.

7. The apparatus according to claim 6, wherein the reference skeleton key point data set comprises shoulder joint key point data and hip joint key point data; and wherein the at least one memory further stores instructions that upon execution by the at least one processor cause the apparatus to:

determine, based on the shoulder joint key point data and the hip joint key point data, a longitudinal central line of the target human body image;

determine a distance between a position represented by the shoulder joint key point data and a position represented by the hip joint key point data, and determine, based on the determined distance, a reference distance; and determine, on each of two sides of the longitudinal central line, a straight line at the reference distance from the longitudinal central line as the longitudinal boundary line.

8. The apparatus according to claim 6, wherein the at least one memory further stores instructions that upon execution by the at least one processor cause the apparatus to:

a third determining unit configured to determine at least two pieces of target reference skeleton key point data from the reference skeleton key point data set, and acquire abscissas in the target reference skeleton key point data;

transform the abscissas in the target reference skeleton key point data based on a predetermined abscissa transformation formula; and perform curve fitting on the abscissas in the target reference skeleton key point data and the transformed abscissas, to obtain a coordinate transformation table representing a correspondence between an abscissa in the skeleton key point data and a transformed abscissa.

9. The apparatus according to claim 8, wherein the at least one memory further stores instructions that upon execution by the at least one processor cause the apparatus to:
determine an initial transformed abscissa of the pixel point based on the coordinate transformation table;
determine a region containing the pixel point in the target human body image, and determine a transformation coefficient corresponding to the region containing the pixel point, wherein a correspondence between the region containing the pixel point and the transformation coefficient is set in advance;
transform the initial transformed abscissa of the pixel point based on the determined transformation coefficient, to obtain a final transformed abscissa of the pixel point; and
determine the final transformed abscissa of the pixel point and an ordinate of the pixel point as the transformed coordinate of the pixel point.

10. The apparatus according to claim 6, wherein the at least one memory further stores instructions that upon execution by the at least one processor cause the apparatus to:
reshape the target region based on the obtained transformed coordinate, to obtain a reshaped human body image.

11. A non-transitory computer readable medium storing computer programs, wherein the programs is used to, when being executed by a processor, perform operations, the operations comprising:
acquiring a target human body image;
determining a skeleton key point data set from the target human body image;
determining, based on the skeleton key point data set, a target region in the target human body image, wherein the determining, based on the skeleton key point data set, a target region in the target human body image further comprises:
determining, based on skeleton key point data in the skeleton key point data set, a transverse boundary line in the target human body image,
selecting at least two pieces of skeleton key point data from the skeleton key point data set to form a reference skeleton key point data set,
determining, based on the reference skeleton key point data set, a longitudinal boundary line in the target human body image, and
determining the target region as a region surrounded by the transverse boundary line and the longitudinal boundary line; and
for each of pixel points comprised in the target region, performing coordinate transformation on the pixel point to generate a transformed coordinate of the pixel point.

12. The non-transitory computer readable medium according to claim 11,
wherein the reference skeleton key point data set comprises shoulder joint key point data and hip joint key point data; and
wherein the determining, based on the reference skeleton key point data set, a longitudinal boundary line in the target human body image comprises:
determining, based on the shoulder joint key point data and the hip joint key point data, a longitudinal central line of the target human body image;
determining a distance between a position represented by the shoulder joint key point data and a position represented by the hip joint key point data, and determining, based on the determined distance, a reference distance; and
determining, on each of two sides of the longitudinal central line, a straight line at the reference distance from the longitudinal central line as the longitudinal boundary line.

13. The non-transitory computer readable medium according to claim 11, wherein before the for each of pixel points comprised in the target region, performing coordinate transformation on the pixel point, to generate a transformed coordinate of the pixel point, the operations further comprise:
determining at least two pieces of target reference skeleton key point data from the reference skeleton key point data set, and acquiring abscissas comprised in the target reference skeleton key point data;
transforming the abscissas in the target reference skeleton key point data based on a predetermined abscissa transformation formula; and
performing curve fitting on the abscissas in the target reference skeleton key point data and the transformed abscissas, to obtain a coordinate transformation table representing a correspondence between an abscissa in the skeleton key point data and a transformed abscissa.

14. The non-transitory computer readable medium according to claim 13, wherein the performing coordinate transformation on the pixel point to generate a transformed coordinate of the pixel point comprises:
determining an initial transformed abscissa of the pixel point based on the coordinate transformation table;
determining a region containing the pixel point in the target human body image, and determining a transformation coefficient corresponding to the region containing the pixel point, wherein a correspondence between the region containing the pixel point and the transformation coefficient is set in advance;
transforming the initial transformed abscissa of the pixel point based on the determined transformation coefficient, to obtain a final transformed abscissa of the pixel point; and
determining the final transformed abscissa of the pixel point and an ordinate of the pixel point as the transformed coordinate of the pixel point.

15. The non-transitory computer readable medium according to claim 11, wherein after the for each of pixel points comprised in the target region, performing coordinate transformation on the pixel point to generate a transformed coordinate of the pixel point, the operations further comprise:
reshaping the target region based on the obtained transformed coordinate, to obtain a reshaped human body image.

* * * * *